(12) United States Patent
Kassner

(10) Patent No.: US 7,389,680 B2
(45) Date of Patent: Jun. 24, 2008

(54) METHOD AND DEVICE FOR ANALYZING A SENSOR ELEMENT

(75) Inventor: Uwe Kassner, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 125 days.

(21) Appl. No.: 11/232,784

(22) Filed: Sep. 21, 2005

(65) Prior Publication Data

US 2006/0086180 A1   Apr. 27, 2006

(30) Foreign Application Priority Data

Oct. 26, 2004   (DE) ............... 10 2004 051 901

(51) Int. Cl.
*G01M 15/00* (2006.01)

(52) U.S. Cl. ........................................... 73/115

(58) Field of Classification Search ................... 73/115
See application file for complete search history.

(56) References Cited

U.S. PATENT DOCUMENTS 6,999,882 B2 *   2/2006   Frie et al. ..................... 702/50

* cited by examiner

*Primary Examiner*—Eric S. McCall
*Assistant Examiner*—Jermaine Jenkins
(74) *Attorney, Agent, or Firm*—Kenyon & Kenyon LLP

(57) ABSTRACT

A method and a device for analyzing a sensor element are described, which allow a temperature dependence of the sensor element to be considered without an additional temperature sensor in particular. The sensor element outputs a signal as a function of a measured variable. The signal of the sensor element is analyzed in a first analysis operating mode to detect the measured variable. The signal of the sensor element is analyzed in a second analysis operating mode to detect a characteristic variable of the sensor element which is different from the measured variable.

8 Claims, 3 Drawing Sheets

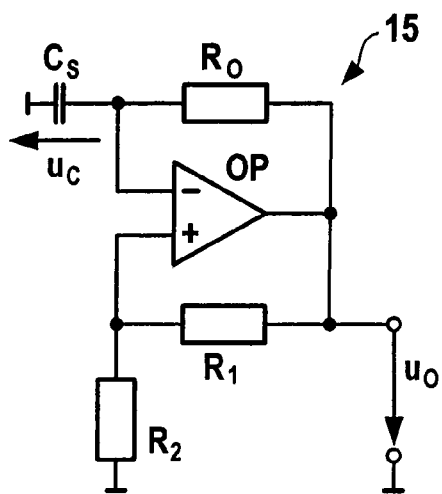
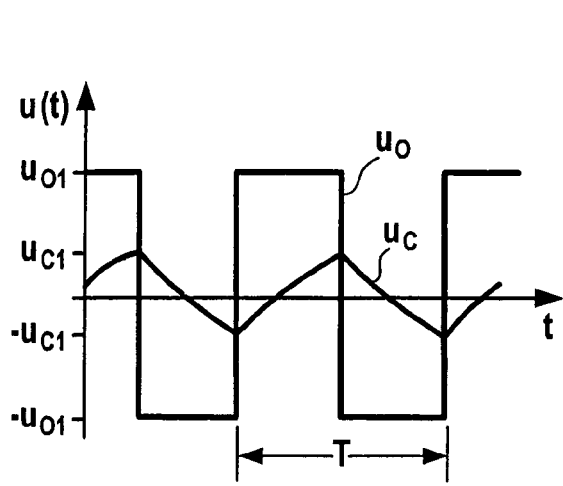
Fig. 1a  Fig. 1b
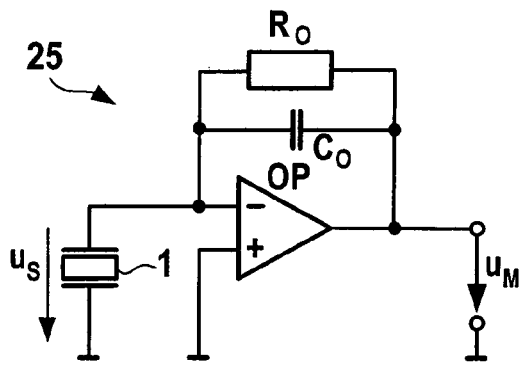
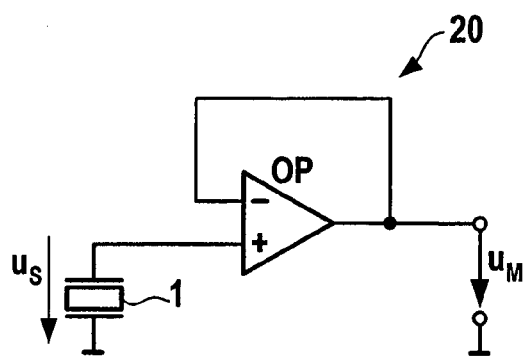
Fig. 2  Fig. 3
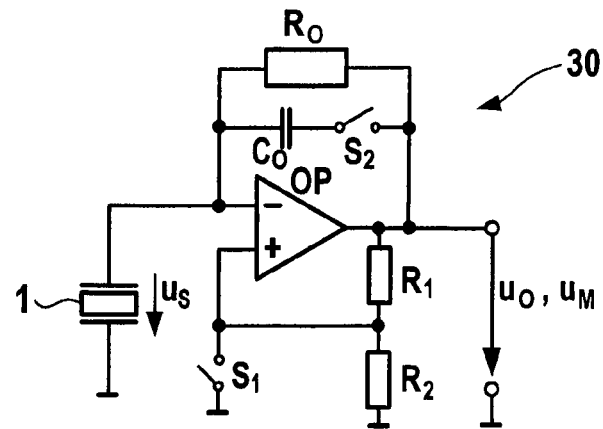
Fig. 4

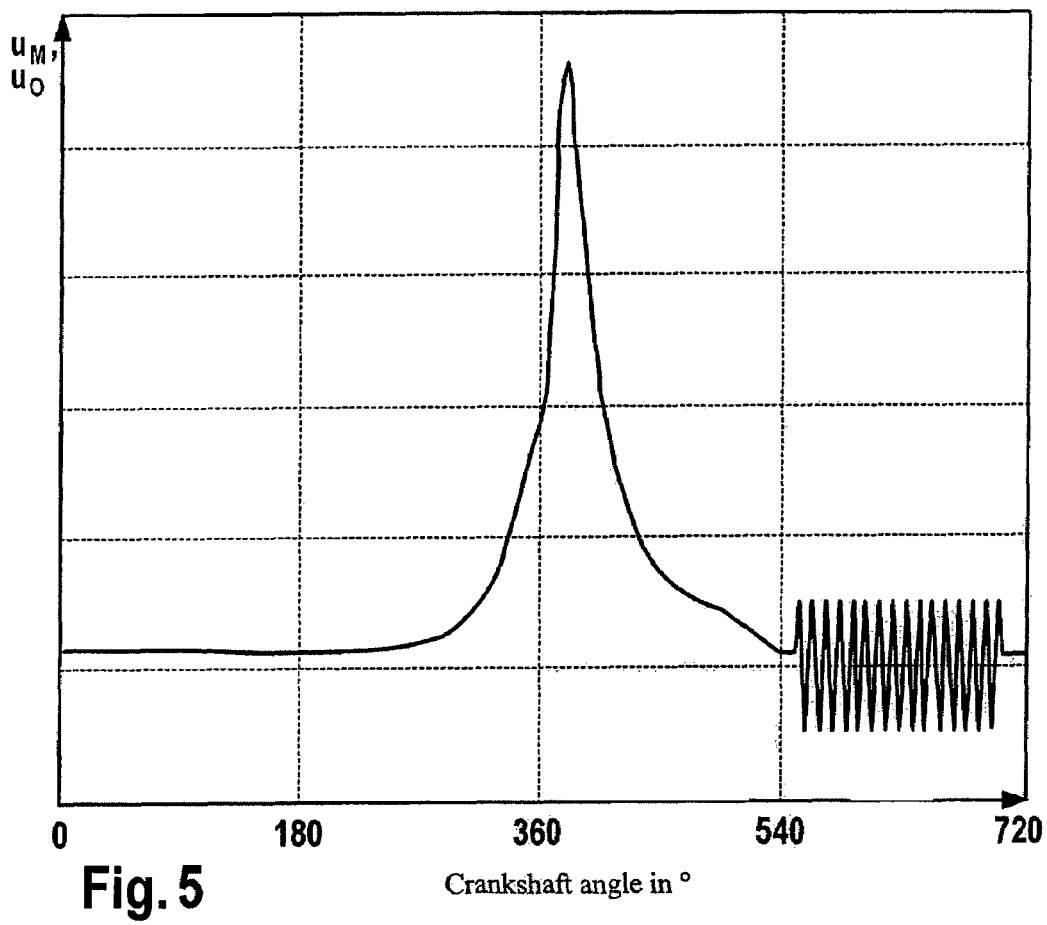
Fig. 5  Crankshaft angle in °
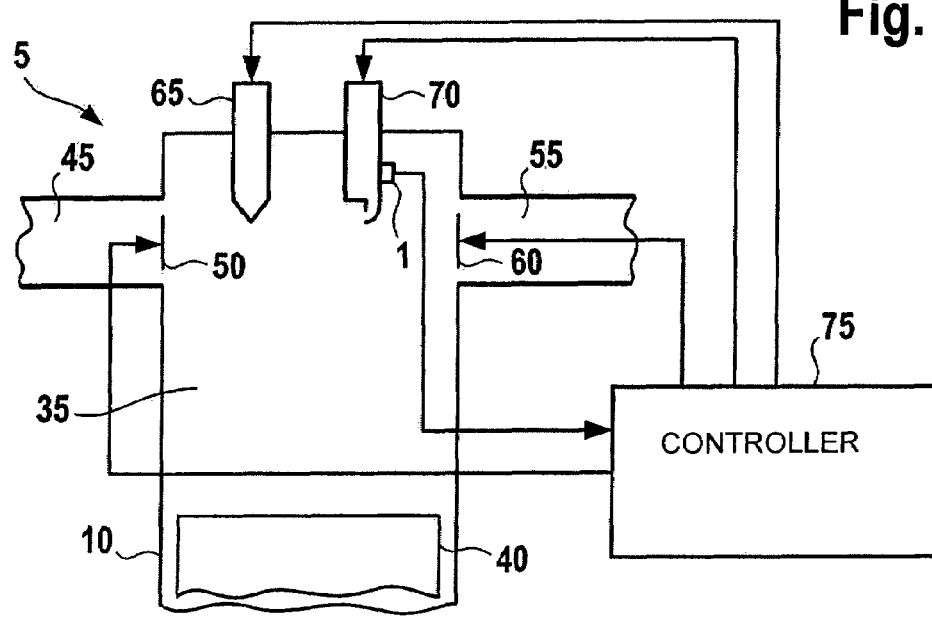
Fig. 6

METHOD AND DEVICE FOR ANALYZING A SENSOR ELEMENT

FIELD OF THE INVENTION

The present invention is directed to a method and a device for analyzing a sensor element.

BACKGROUND INFORMATION

Methods and devices for analyzing a sensor element are available, the sensor element outputting a signal as a function of a measured variable.

It has been suggested that for controlling internal combustion engines, the combustion chamber pressure is determined, in addition to other measured variables. Multiple publications describe technical approaches for detecting the combustion chamber pressure.

Measuring sensors or sensor elements which operate according to the piezoelectric principle appear particularly attractive. A suitable material, such as quartz or a sintered ceramic material, is subjected to the combustion chamber pressure. The material is, for example, installed as a disk in a suitable housing and mounted in a conventional way in a cylinder head as a combustion chamber pressure sensor. Furthermore, integration into an already existing component, such as a spark plug or glow plug, is conventional. A charge, which is proportional to the pressure, arises in the material of the sensor element subjected to the combustion chamber pressure, which may be converted into a voltage signal using a suitable electronic circuit, e.g., a charge amplifier or impedance transformer. This voltage is processed further in an engine control unit and incorporated into different closed-loop and open-loop controls of the engine. The combustion chamber pressure of each cylinder of the internal combustion engine is typically sampled synchronously with a crankshaft angle, for example, at a resolution of 1° crankshaft angle.

If a piezoceramic material, such as the sintered ceramic material, is used for the measuring sensor or the sensor element, it is distinguished by a comparatively high sensitivity, i.e., it generates a greater charge at a given pressure than quartz. A disadvantage in this case is the pronounced temperature dependence of the sensitivity in such piezoceramic materials. Therefore, determining the temperature of the sensor element would be advantageous, in order to be able to suitably compensate for the temperature error in subsequent signal processing.

Conventional approaches include mounting a temperature sensor in the proximity of the sensor element to detect the combustion chamber pressure, also referred to in the following as a combustion chamber pressure sensor. Alternatively, the temperature error may also be compensated for using a capacitive charge divider, the corresponding capacitor of the capacitive charge divider having to have the same temperature as the combustion chamber pressure sensor. This is described in "A. Peterson, Temperaturkompensation piezokeramischer Sensoren [Temperature Compensation of Piezoceramic Sensors], Elektronikindustrie 12-1988." Both of these methods have the disadvantage of requiring that still further components be housed in the already restricted installation space of the combustion chamber pressure sensor.

SUMMARY

A method and device according to an example embodiment of the present invention for analyzing a sensor element may have the advantage over the related art that the signal of the sensor element is analyzed in a first analysis operating mode to detect the measured variable, and the signal of the sensor element is analyzed in a second analysis operating mode to detect a characteristic variable of the sensor element which is different from the measured variable. In this way, both the measured variable and also the characteristic variable of the sensor element which is different from the measured variable may be derived from the signal of the sensor element. A separate sensor for detecting the characteristic variable of the sensor element which is different from the measured variable is therefore not necessary, nor is the conventional compensator circuit. The functionality of the sensor element signal is thus enhanced.

It may be particularly advantageous if the changeover between the two analysis operating modes is performed as a function of at least one controlled variable. In this way, it is ensured that the signal of the sensor element is either analyzed in the first analysis operating mode or in the second analysis operating mode, but not simultaneously in both analysis operating modes. Therefore, the analysis operating modes may additionally be defined as a function of the at least one controlled variable and thus set, for example, under suitable operating conditions in each case.

It may be particularly advantageous if a combustion chamber pressure sensor for detecting a combustion chamber pressure of an internal combustion engine is selected as the sensor element. In this way, the combustion chamber pressure may be detected from the signal of the combustion chamber pressure sensor in the first analysis operating mode and the temperature of the combustion chamber pressure sensor may be detected in the second analysis operating mode, so that neither an additional temperature sensor in the proximity of the pressure sensor nor the compensation for the temperature influence using a capacitive charge divider is necessary.

If the sensor element is implemented as a combustion chamber pressure sensor of an internal combustion engine, a crankshaft angle of the internal combustion engine may be selected as the controlled variable, through which different operating states of the internal combustion engine which are a function of the crankshaft angle may be assigned to one of the two analysis operating modes in a particularly simple and reliable manner in each case, so that the particular analysis operating mode may also be activated as a function of the occurrence of the assigned operating state of the internal combustion engine using the crankshaft angle.

A further advantage may result if the second analysis operating mode for detecting the characteristic variable of the sensor element which is different from the measured variable is set for a cylinder of the internal combustion engine during at least one exhaust stroke of this cylinder. During the exhaust stroke, determining the combustion chamber pressure and/or determining features of the combustion in general are not significant, so that this operating phase of the cylinder may be used to detect the characteristic variable of the sensor element which is different from the measured variable without impairing the analysis of the measured variable. Furthermore, it may be advantageous if a frequency of the setting of the second analysis operating mode for detecting the characteristic variable of the sensor element which is different from the measured variable is selected as a function of a rate of change of the characteristic variable. In this way, the setting of the second analysis operating mode may be reduced to a minimum. The lower the rate of change of the characteristic variable, the less frequently must the detection of the characteristic variable be refreshed and/or repeated to update the values for the characteristic variable.

It may be advantageous in connection with implementation of the sensor element as a combustion chamber pressure sensor in particular if a temperature or a capacitance is analyzed as the characteristic variable of the sensor element.

In this case, to detect the temperature or capacitance, the sensor element may be incorporated in a particularly easy and less complex way into an oscillator circuit, in particular an astable multivibrator, which generates a frequency which is a function of only the capacitance of the sensor element. In this way, the capacitance of the sensor element may also be determined in a particularly simple and reliable manner.

Furthermore, it may be advantageous if, to detect the measured variable, the sensor element is incorporated into an impedance transformer circuit or into a charge amplifier circuit. Because of the similarities in circuitry between the charge amplifier circuit or the impedance transformer circuit and the oscillator circuit, both the first analysis operating mode and the second analysis operating mode may thus be implemented with minimum circuitry outlay.

BRIEF DESCRIPTION OF THE DRAWINGS

Exemplary embodiments of the present invention are illustrated in the figures and described in greater detail below.

FIG. 1a) shows a circuit for an astable multivibrator.

FIG. 1b) shows a curve of different voltages of the astable multivibrator plotted against time.

FIG. 2 shows a charge amplifier.

FIG. 3 shows an impedance transformer.

FIG. 4 shows an example circuit according to the present invention which includes both a charge amplifier and an astable multivibrator.

FIG. 5 shows a curve of a combustion chamber pressure plotted against a crankshaft angle.

FIG. 6 shows a schematic view of an internal combustion engine.

DETAILED DESCRIPTION OF EXAMPLE EMBODIMENTS

Figure 7:
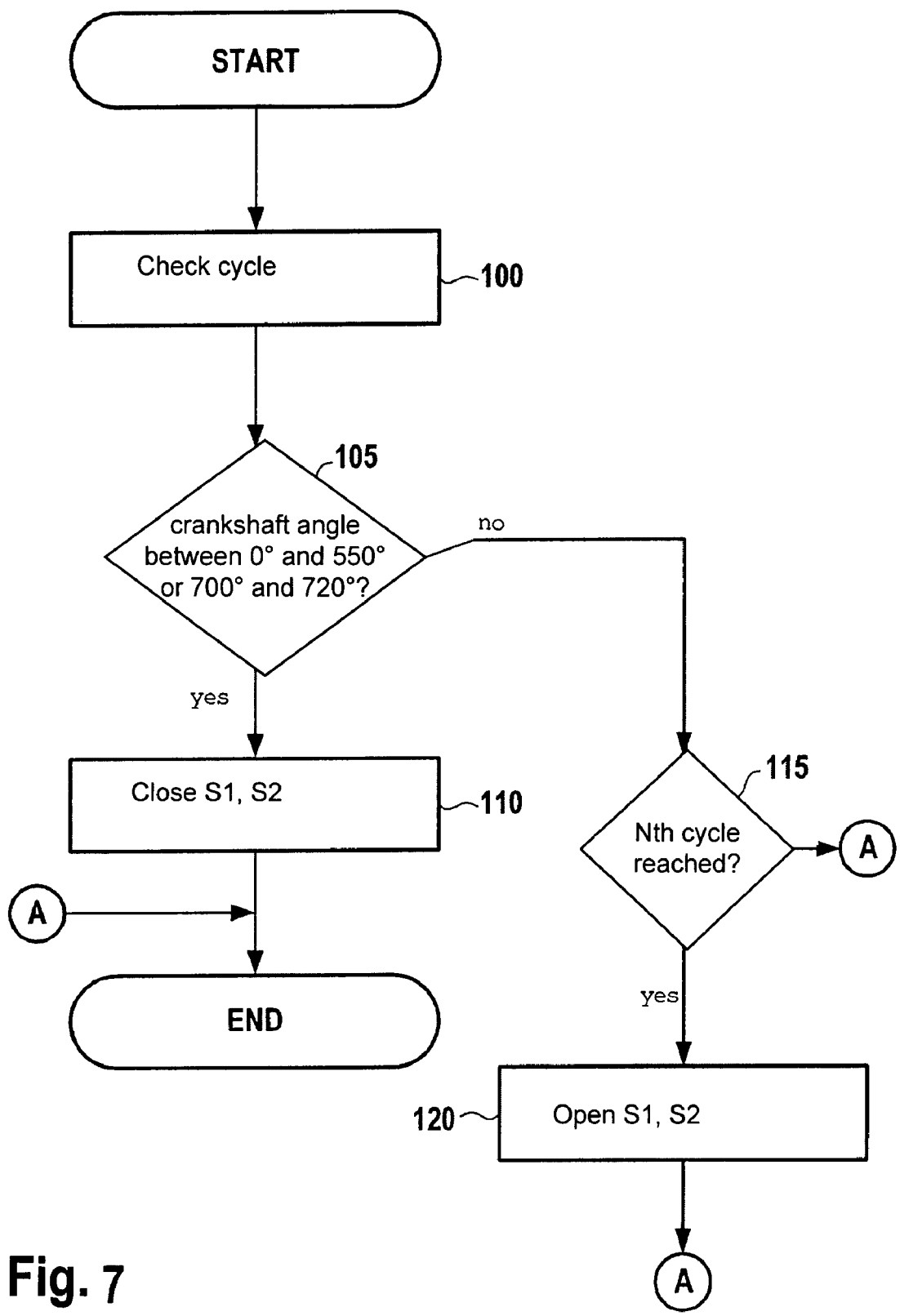
FIG. 7 shows a flow chart for an exemplary sequence of the method according to the present invention.

In FIG. 6, reference numeral 5 identifies an internal combustion engine which drives a vehicle, for example. In this case, internal combustion engine 5 may be implemented as a gasoline engine or as a diesel engine, for example. In the following, it is assumed as an example that internal combustion engine 5 is implemented as a gasoline engine.

Gasoline engine 5 includes one or more cylinders. One of these cylinders is shown as an example and identified by reference numeral 10 in FIG. 6.

Fresh air may be supplied to a combustion chamber 35 of cylinder 10 via an air supply 45 and an intake valve 50. Intake valve 50 may be activated in this case by a controller 75, for example. Fuel is supplied directly to combustion chamber 35 via a fuel injector 65. Fuel injector 65 is also activated by controller 75 as needed to achieve a desired injected fuel quantity and a desired start of fuel injection. The air/fuel mixture produced in combustion chamber 35 in this way is ignited using a spark plug 70, which is also activated by controller 75 to set a suitable moment of ignition, for example. A piston 40 of the cylinder 10, which drives a crankshaft (not shown in FIG. 6), is moved by the energy released during the combustion of the air/fuel mixture in combustion chamber 35. The exhaust gas produced during the combustion of the air/fuel mixture is exhausted via an exhaust valve 60 into an exhaust system 55, exhaust valve 60 also being activated by controller 75 as shown in FIG. 6, for example. Furthermore, controller 75 may also set a desired air supply by activating a final control element not shown in FIG. 6, such as a throttle valve in air supply 45. The fuel injection may also occur downstream from the throttle valve or upstream from the throttle valve into air supply 45, instead of directly into combustion chamber 35, as shown in FIG. 6.

Furthermore, a sensor element 1 is provided, which is implemented in this example as a combustion chamber pressure sensor. Combustion chamber pressure sensor 1 may be mounted in the cylinder head or in combustion chamber 35 of cylinder 10, in a conventional manner. Alternatively, the combustion chamber pressure sensor may also be integrated into an already existing component. In the example shown in FIG. 6, combustion chamber pressure sensor 1 is positioned on spark plug 70 and/or integrated therein, in the combustion chamber side area of spark plug 70. In the case of a diesel engine, combustion chamber pressure sensor 1 may be positioned on a glow plug in the combustion chamber of the diesel engine or integrated into this glow plug, for example. Alternatively, combustion chamber pressure sensor 1 may also be positioned outside the combustion chamber in a way known to those skilled in the art. Combustion chamber pressure sensor 1 produces a signal as a function of the combustion chamber pressure in the way described above, in the form of a charge proportional to the combustion chamber pressure, for example. For this purpose, combustion chamber pressure sensor 1 may be implemented according to the piezoelectric principle as described above, for example, and have a quartz or a sintered ceramic material installed in a suitable housing in the form of a disk, for example. In the following, it is to be assumed for exemplary purposes that combustion chamber pressure sensor 1 is implemented according to the piezoelectric principle and includes a disk made of sintered piezoceramic material in a suitable housing.

A charge proportional to the combustion chamber pressure arises in the piezoceramic material of combustion chamber pressure sensor 1, which is also referred to as the signal of combustion chamber pressure sensor 1 in the following. This charge, i.e., this signal, may be converted into a voltage signal using a suitable electronic circuit, e.g., a charge amplifier as shown in FIG. 2 or an impedance transformer as shown in FIG. 3. This voltage is processed further in controller 75 and may be incorporated into different closed-loop and open-loop controls of internal combustion engine 5. In this way, the signal of combustion chamber pressure sensor 1 is analyzed to detect the combustion chamber pressure as the measured variable by converting the charge of the piezoceramic material of combustion chamber pressure sensor 1, which is proportional to the combustion chamber pressure, into the voltage signal.

A circuit for a charge amplifier, which may be integrated with the exception of combustion chamber pressure sensor 1 into controller 75, is shown for exemplary purposes in FIG. 2. Alternatively, charge amplifier 25 shown in FIG. 2 may also be housed in the proximity of combustion chamber pressure sensor 1, e.g., in the same housing. Charge amplifier 25 shown in FIG. 2 includes an operational amplifier OP, whose non-inverting input is connected to a reference potential, to ground in the example shown in FIG. 2. The inverting input of operational amplifier OP is connected to a terminal of combustion chamber pressure sensor 1, whose other terminal is also connected to the reference potential. Furthermore, the inverting input of operational amplifier OP is connected via a parallel circuit having a first capacitor $C_0$ and a first ohmic resistor $R_0$ to an output of operational amplifier OP. First capacitor $C_0$ and first resistor $R_0$ are in the negative feedback of charge amplifier 25. The potential difference between the output of operational amplifier OP and the reference potential is then the voltage signal converted from the charge of the piezoceramic material of combustion chamber pressure sensor 1 and is referred to in the following as signal voltage $u_M$.

Alternatively, signal voltage $u_M$ may be converted from the charge of the piezoceramic material of combustion chamber pressure sensor 1 using the impedance transformer. FIG. 3 shows an example of such an impedance transformer, which may be integrated with the exception of combustion chamber pressure sensor 1 into controller 75, like the charge amplifier shown in FIG. 2, or alternately may be positioned in the proximity of combustion chamber pressure sensor 1, for example, in the same housing as combustion chamber pressure sensor 1. Impedance transformer 20 shown in the example in FIG. 3 in turn includes operational amplifier OP, whose non-inverting input is connected to a terminal of combustion chamber pressure sensor 1, and whose other terminal is connected to the reference potential, in the present example to ground. The inverting input of operational amplifier OP is connected to the output of operational amplifier OP. Signal voltage $u_M$ is then applied between the output of operational amplifier OP and the reference potential. Impedance transformer 20 shown in FIG. 3 may, for example, have amplifier 1 as a special case of the electrometer amplifier.

Sensor voltage $u_S$ produced by the charge of the piezoceramic material at combustion chamber pressure sensor 1 may be amplified and/or converted as the sensor signal into signal voltage $u_M$ at the output of operational amplifier OP both by the charge amplifier shown in FIG. 2 and also by the impedance transformer shown in FIG. 3.

As described above, the cited piezoceramic materials are characterized by a comparatively high sensitivity, i.e., they generate a greater charge at a given combustion chamber pressure than in the case where quartz is used. A disadvantage in this case is, as described, the pronounced temperature dependence of the sensitivity in the case of a piezoceramic material.

According to an example embodiment of the present invention, a second analysis operating mode is provided in addition to the described first analysis operating mode for detecting signal voltage $u_M$, in which a characteristic variable of combustion chamber pressure sensor 1 which is different from the measured variable, i.e., in this example from the combustion chamber pressure or signal voltage $u_M$, is analyzed. This characteristic variable of combustion chamber pressure sensor 1 may, for example, be the temperature or the capacitance of combustion chamber pressure sensor 1. There is a connection between the capacitance and the temperature of combustion chamber pressure sensor 1 which may be stored in a characteristic curve calibrated on a test bench, for example. Therefore, the temperature of combustion chamber pressure sensor 1 may be inferred from the capacitance of combustion chamber pressure sensor 1. A characteristic curve calibrated on a test bench may also, for example, represent the relationship between the sensitivity of combustion chamber pressure sensor 1 and the temperature of combustion chamber pressure sensor 1. Signal voltage $u_M$ may then be corrected as the characteristic variable for the combustion chamber pressure as a function of the current sensitivity of combustion chamber pressure sensor 1. This correction may therefore be performed if the capacitance of combustion chamber pressure sensor 1 is known and with the aid of the two characteristic curves described. FIG. 1a) shows a circuit system having operational amplifier OP, with the aid of which a capacitance may be determined indirectly through a frequency measurement. The circuit system shown in FIG. 1a) is an oscillator circuit which produces a square wave, for example, whose frequency, at fixed values of the ohmic resistors of the circuit system, is only a function of capacitor $C_S$ of combustion chamber pressure sensor 1. This oscillator circuit may, for example, be an astable multivibrator. This is identified in FIG. 1a) by reference numeral 15. Combustion chamber pressure sensor 1 is considered as capacitor $C_S$ of combustion chamber pressure sensor 1 having a temperature-dependent value for this purpose and incorporated into the oscillator circuit of astable multivibrator 15. Such an astable multivibrator is described in, for example, "Horst Wupper, Professionelle Schaltungstechnik mit Operationsverstärkern [Professional Circuit Engineering using Operational Amplifiers], Franzis-Verlag, 1994." As shown in FIG. 1a), astable multivibrator 15 in turn includes operational amplifier OP, whose inverting input is connected to a terminal of capacitor $C_S$ of combustion chamber pressure sensor 1. The other terminal of capacitor $C_S$ of combustion chamber pressure sensor 1 is connected to a reference potential, in the present example to ground. First ohmic resistor $R_0$ connects the inverting input to the output of operational amplifier OP. The non-inverting input of operational amplifier OP is connected via a second ohmic resistor $R_1$ to the output of operational amplifier OP and via a third ohmic resistor $R_2$ to the reference potential. The voltage between the output of operational amplifier OP and the reference potential is identified in FIG. 1a) by $u_0$. The voltage from the inverting input of operational amplifier OP to the reference potential is identified in FIG. 1 by $u_C$ and corresponds to sensor voltage $u_S$ shown in FIG. 2 and FIG. 3.

FIG. 1b) shows a diagram for the curve of a voltage u(t) over time t. In this case, voltage $u_0$ and, in addition, voltage $u_C$ are illustrated in the diagram shown in FIG. 1b). Voltage $u_0$ executes a square wave oscillation having the period T between value $U_{01}$ and value $-U_{01}$. Voltage $U_C$ also oscillates with the same period, the capacitor being charged with capacitance $C_S$ when output voltage $U_O$ of operational amplifier OP assumes value $U_{01}$ and otherwise being discharged. The frequency of the square wave of output voltage $u_0$ may be calculated from measured period T through inverse value calculation. The period may be determined with the aid of a counter in a microprocessor of controller 75, for example. Capacitance $C_S$ of combustion chamber pressure sensor 1 may be determined in a conventional way from frequency and/or period T and fixedly predefined ohmic resistances $R_0$, $R_1$, and $R_2$. Therefore, the frequency of square wave $u_0$ of the astable multivibrator with fixedly predefined ohmic resistances $R_0$, $R_1$, and $R_2$ is only a function of capacitance $C_S$ of combustion chamber pressure sensor 1. If the signal of combustion chamber pressure sensor 1 is analyzed in the first analysis operating mode to detect signal voltage $u_M$ and in the second analysis operating mode to detect capacitance $C_S$ of combustion chamber pressure sensor 1, this may be performed by analyzing the signal of combustion chamber pressure sensor 1, i.e., sensor voltage $u_S$, with the aid of the charge amplifier shown in FIG. 2 and/or the impedance transformer shown in FIG. 3 to detect signal voltage $u_M$. For the second analysis operating mode, the signal of combustion chamber pressure sensor 1, i.e., voltage $u_C$ at capacitance $C_S$ of combustion chamber pressure sensor 1, which corresponds to sensor voltage $u_S$, may be analyzed using the astable multivibrator shown in FIG. 1a) to determine capacitance $C_S$ of combustion chamber pressure sensor 1. The changeover between the two analysis operating modes may be performed as a function of a controlled variable, for example. For example, crankshaft angle KW of internal combustion engine 5 may be selected as the controlled variable. This means that the first analysis operating mode is executed for a first range of crankshaft angle KW and the second analysis operating mode is executed for a second range of crankshaft angle KW.

In this case, the second analysis operating mode for detecting capacitance $C_S$ of combustion chamber pressure sensor 1 may advantageously be executed during at least one exhaust stroke of cylinder 10. In the phase of the exhaust stroke of cylinder 10, determining features of the combustion and, in particular, detecting the combustion chamber pressure is not significant or of interest, so that in this phase the second analysis operating mode for detecting capacitance $C_S$ of combustion chamber pressure sensor 1 may be executed without impairing the analysis of the combustion chamber pressure. The changeover into the second analysis operating mode and therefore into the oscillator operation according to the circuit system shown in FIG. 1a) may be performed in every operating cycle of the cylinder and, therein, in the exhaust stroke of the cylinder. Alternatively, the changeover into the second analysis operating mode may also be performed only in every nth cycle and, therein, in the exhaust stroke of cylinder 10. For this purpose, the thermal behavior of piezoelectric combustion chamber pressure sensor 1 may be examined and a suitable frequency for changing over to the second analysis operating mode may be determined and preferably programmed in controller 75 as a function of its time constant, i.e., of the rate of change of capacitance $C_S$ of combustion chamber pressure sensor 1 over time. The lower the rate of change of capacitance $C_S$ of combustion chamber pressure sensor 1 over time, the less frequently is a changeover required into the second analysis operating mode to detect capacitance $C_S$ of combustion chamber pressure sensor 1. The rate of change of capacitance $C_S$ of the combustion chamber pressure sensor may also be a function of the operating point of internal combustion engine 5, for example. The changeover frequency, i.e., number n, may thus also be selected as a function of the operating point of internal combustion engine 5. In this case, for example, an associated rate of change of capacitance $C_S$ of combustion chamber pressure sensor 1 may be determined over time for each different operating point of the engine and stored in a characteristic curve on the test bench, the individual rates of change in turn each being assigned a changeover frequency for changing over to the second analysis operating mode in a further characteristic curve, which may also be calibrated suitably on a test bench. Therefore, with the aid of these two characteristic curves, the required changeover frequency for changing over to the second analysis operating mode may be inferred from the operating point of internal combustion engine 5. In general, the changeover frequency may be set lower the lower the rate of change of capacitance $C_S$ of combustion chamber pressure sensor 1.

In a particularly simple and inexpensive way, the changeover between the two analysis operating modes may be implemented by designing one single circuit for executing the two analysis operating modes. Such a circuit is illustrated in FIG. 4. This circuit system is identified by reference numeral 30 and represents an expansion of the already existing circuit for analyzing sensor signal $u_S$ and converting it into signal voltage $u_M$, which is processed further in controller 75. Circuit 30 shown in FIG. 4 builds on the charge amplifier shown in FIG. 2. In this case, the inverting input of operational amplifier OP is connected via a combustion chamber pressure sensor 1 to the reference potential, in this example to ground. The voltage, which drops across combustion chamber pressure sensor 1, is also identified in FIG. 4 by $u_S$ as the sensor voltage. The inverting input of operational amplifier OP is connected via first ohmic resistor $R_0$ to the output of operational amplifier OP. First capacitor $C_0$ may be connected in parallel to first ohmic resistor $R_0$ via a second switch $S_2$.

The non-inverting input of operational amplifier OP is connected via second ohmic resistor $R_1$ to the output of operational amplifier OP. Furthermore, the non-inverting input of operational amplifier OP is connected via third ohmic resistor $R_2$ to the reference potential. The non-inverting input of operational amplifier OP is additionally connectable via a first switch $S_1$ to the reference potential. The voltage between the output of operational amplifier OP and the reference potential is output voltage $u_0$ of astable multivibrator 15 or signal voltage $u_M$ of charge amplifier 25, depending on the selected analysis operating mode. With the aid of both switches $S_1$ and $S_2$ it is now possible to modify an amplifier circuit, in this case operational amplifier OP, using further components $R_0$, $R_1$, $R_2$, and $C_0$ in such a way that the system operates either as an oscillator according to the astable multivibrator shown in FIG. 1a) or as a charge amplifier as shown in FIG. 2. First ohmic resistor $R_0$ is selected in such a way that it may be used for the operating mode of circuit 30 as a charge amplifier. Dimensioning first ohmic resistor $R_0$ to establish a lower limiting frequency of the charge amplifier and therefore of the signal processing of the combustion chamber pressure detected via signal voltage $u_M$ is known to those skilled in the art. If it is not possible to use first ohmic resistor $R_0$ jointly for both analysis operating modes, a further switch, not shown in FIG. 4, may be used to change over between two ohmic resistors instead of first ohmic resistor $R_0$. The analysis operating mode of circuit 30 is now selected using both switches $S_1$ and $S_2$: if both switches $S_1$ and $S_2$ are closed, circuit 30 operates as a charge amplifier as shown in FIG. 2. If both switches $S_1$ and $S_2$ are open, circuit 30 operates in oscillator operation as the astable multivibrator shown in FIG. 1a).

Both switches $S_1$ and $S_2$ may be implemented as electronic switches, for example, and are controlled in this example as a function of the crankshaft angle in such a way that the combustion chamber pressure in the form of signal voltage $u_M$ is analyzed in the range of interest of the engine cycle of cylinder 10. In another range of the crankshaft angle, circuit 30 then acts as the astable multivibrator for determining capacitance $C_S$ of combustion chamber pressure sensor 1.

If the changeover between the two analysis operating modes is controlled in controller 75, the changeover to the particular signal processing of the output signal of circuit 30 may thus be performed in controller 75. During the time of oscillator operation, the output signal of circuit 30 is then not interpreted as signal voltage $u_M$, but rather as output voltage $u_0$ of the astable multivibrator, i.e., not as the characteristic variable for the combustion chamber pressure. Rather, output voltage $u_0$ is analyzed in this case to determine frequency or period T using a counter in a microprocessor of controller 75, for example, and therefore to determine capacitance $C_S$ of combustion chamber pressure sensor 1. During the time of the charge amplifier operation, the output signal of circuit 30 is interpreted as signal voltage $u_M$ and therefore as the characteristic variable for the combustion chamber pressure. Specific variables of the combustion may be calculated in controller 75 from signal voltage $u_M$.

For the oscillator operation of circuit 30 to determine capacitance $C_S$ of combustion chamber pressure sensor 1, ohmic resistors $R_0$, $R_1$, and $R_2$ are suitably dimensioned in such a way that the frequency of output voltage $u_0$ is in a range in which a sufficient number of periods of the square wave generated as shown in FIG. 1b) are generated in the crankshaft angle range of the second analysis operating mode, and the internal cycle of the microprocessor of controller 75 allows adequate resolution of the frequency of this square wave. In this way, it is ensured that the frequency of the square wave and therefore capacitance $C_S$ of combustion chamber pressure sensor 1 may be determined reliably during the second analysis operating mode. With increasing engine speed, the time for the exhaust stroke of cylinder 10 becomes shorter and shorter, so that under certain circumstances the frequency of the square waves of output voltage $u_0$ determined by the dimensioning of ohmic resistors $R_0$, $R_1$, and $R_2$ no longer provides sufficient periods in the crankshaft angle range for the second analysis operating mode. Therefore, in an alternative embodiment of the present invention, first ohmic resistor $R_0$, second ohmic resistor $R_1$, and/or third ohmic resistor $R_2$ may be replaced by another ohmic resistor in each case, using a changeover circuit, as a function of the engine speed of internal combustion engine 5 in order to ensure, at different engine speeds, that there is a sufficient number of periods of the square wave signal of output voltage $u_0$ in the crankshaft angle range for the second analysis operating mode and an adequate resolution of the frequency of this square wave is ensured by the internal clock of the microprocessor of controller 75.

In the example shown in FIG. 4, the circuit of the charge amplifier shown in FIG. 2 is combined with the circuit of the astable multivibrator shown in FIG. 1a) into single circuit 30 using switches $S_1$, $S_2$, so that it is possible to change over between them. In a similar way, the circuit of the impedance transformer shown in FIG. 3 may be combined with the circuit of the astable multivibrator shown in FIG. 1a) so it is possible to change over between them.

FIG. 5 shows the output signal of operational amplifier OP of circuit 30 shown in FIG. 4 plotted against the crankshaft angle in degrees. During the combustion of the air/fuel mixture in combustion chamber 35 of cylinder 10 in a range between 0° crankshaft angle and approximately 550° crankshaft angle and between approximately 700° crankshaft angle and 720° crankshaft angle, the first analysis operating mode is executed and output signal of operational amplifier OP corresponds to signal voltage $u_M$. In this case, first switch $S_1$ and second switch $S_2$ are closed. In the second analysis operating mode between approximately 550° crankshaft angle and approximately 700° crankshaft angle, both switches $S_1$ and $S_2$ are open and switch 30 operates in oscillator operation, i.e., the voltage $u_0$ is applied at the output in the form of the approximately square wave, from whose frequency capacitance $C_S$ of combustion chamber pressure sensor 1 may be determined in the way described. In FIG. 5, the curve of the combustion chamber pressure is shown for the first analysis operating mode in the form of signal voltage $u_M$ having a maximum in the expansion phase of cylinder 10 at approximately 370° crankshaft angle.

Described configurable circuit 30 may be constructed from discrete electronic components, but also as an integrated circuit. The circuit may be positioned in the proximity of combustion chamber pressure sensor 1, for example, in the same housing, or may be integrated into controller 75. Combustion chamber pressure sensor 1 is typically not integrated into controller 75 in this case.

Switches $S_1$, $S_2$ may be electronic components, in the form of transistors or other semiconductor switches, for example, or may be conventional elements, such as relays.

The temperature response of piezoelectric elements is known from characteristic curves. If influencing factors, which are not a function of temperature, on the capacitance of such piezoelectric elements as combustion chamber pressure sensor 1, which are fixed by material properties and geometric dimensions, are constant, capacitance $C_S$ of combustion chamber pressure sensor 1 and therefore the temperature may be inferred directly from the oscillation frequency of the square wave shown in FIG. 1b) in oscillator operation of circuit 30, i.e., the second analysis operating mode.

Calibration of the characteristic curve between capacitance $C_S$ of combustion chamber pressure sensor 1 and the temperature of combustion chamber pressure sensor 1 allows the temperature-independent influencing factors of capacitance $C_S$ of combustion chamber pressure sensor 1 to be considered. For this purpose, in a further embodiment of the present invention, a temperature of sensor element 1, in this case the combustion chamber pressure sensor, may be measured at a defined operating point of internal combustion engine 5. At this defined operating point, the temperature of the combustion chamber pressure sensor is additionally determined in the way described from the frequency of the square wave of output voltage $u_0$ in the second analysis operating mode of circuit 30 via capacitance $C_S$ of combustion chamber pressure sensor 1 and the previously described temperature-capacitance characteristic curve. This temperature-capacitance characteristic curve is then corrected so that the temperature for assigned capacitance $C_S$ of combustion chamber pressure sensor 1 measured in the cited operating point of internal combustion engine 5 is on the temperature-capacitance characteristic curve. For this purpose, the characteristic curve must be shifted, while its slope remains the same, until the measured temperature is on the characteristic curve associated with capacitance $C_S$ determined at this operating point. For example, directly before or after completing the engine start, a temperature may be measured which corresponds as closely as possible to the temperature of combustion chamber pressure sensor 1 as the predefined operating point for this calibration procedure. If combustion chamber pressure sensor 1 is mounted in the cylinder head or on a component in the cylinder head, the coolant temperature is a suitable temperature, whose measured value approximately corresponds to the temperature of the combustion chamber pressure sensor directly before or after the engine start, in particular if internal combustion engine 5 has been cooled to the ambient temperature before the engine start. The coolant temperature measured directly after the engine start then also approximately corresponds to the ambient temperature.

As an alternative to using circuit 30 for executing the two analysis operating modes, during the first analysis operating mode, the charge amplifier shown in FIG. 2 or the impedance transformer shown in FIG. 3 may be connected to combustion chamber pressure sensor 1 and, during the second analysis operating mode, the astable multivibrator shown in FIG. 1a) may be connected to combustion chamber pressure sensor 1, so that depending on the analysis operating mode, combustion chamber pressure sensor 1 is connected to a different circuit in each case using a switch, for example. In this case, to determine capacitance $C_S$ of combustion chamber pressure sensor 1, combustion chamber pressure sensor 1 may also be disconnected during the second analysis operating mode from the charge amplifier shown in FIG. 2 or from the impedance transformer shown in FIG. 3 and instead connected to a measuring circuit. An embodiment of such a measuring circuit is, for example, a bridge circuit for directly determining capacitance $C_S$ of combustion chamber pressure sensor 1, which is known to those skilled in the art. For analyzing the signal of combustion chamber pressure sensor 1 to detect the measured variable and/or signal voltage $u_M$, any other arbitrary circuits for signal processing known to those skilled in the art may also be used for the connection to combustion chamber pressure sensor 1 during the first analysis operating mode.

In the first analysis operating mode, combustion chamber pressure sensor 1 may only be connected to a circuit for analyzing the signal of combustion chamber pressure sensor 1 to detect the measured variable using signal voltage $u_M$, for example, and, in the second analysis operating mode, combustion chamber pressure sensor 1 may only be connected to a circuit for detecting the characteristic variable of combustion chamber pressure sensor 1 which is different from the measured variable, in this example the capacitance or the temperature of combustion chamber pressure sensor 1 using output voltage $u_0$.

In the exemplary embodiments described above, charge amplifier 25 shown in FIG. 2 and/or impedance transformer 20 shown in FIG. 3 and/or circuit 30 having closed switches $S_1$, $S_2$ represent first analysis means and the astable multivibrator shown in FIG. 1a) and/or circuit 30 having open switches $S_1$, $S_2$ shown in FIG. 4 represent second analysis means.

Specific variables of the combustion may be calculated in controller 75 in a conventional way from signal voltage $u_M$.

A flow chart for an exemplary sequence of the method according to the present invention is illustrated in FIG. 7. After the start of the program, controller 75 detects instantaneous crankshaft angle KW at program point 100 using a crankshaft angle sensor in a way known to those skilled in the art, for example. Furthermore, controller 75 may optionally establish the frequency of setting the second analysis operating mode as a function of the rate of change of capacitance $C_S$ of combustion chamber pressure sensor 1 by predefining a suitable value n at program point 100, so that the second analysis operating mode is activated only in every nth cycle of cylinder 10. The rate of change of capacitance $C_S$ of combustion chamber pressure sensor 1 over time may be determined by controller 75 from previously determined values for capacitance $C_S$. Furthermore, controller 75 checks at program point 100 in which cycle the second analysis operating mode was last activated. Subsequently, the program branches to a program point 105.

At program point 105, controller 75 checks whether the currently determined crankshaft angle is in the range between 0° and 550° or between 700° and 720°. If so, the program branches to a program point 110, otherwise the program branches to a program point 115.

At program point 110, controller 75 causes the closing of both switches $S_1$, $S_2$ and therefore activates the first analysis operating mode. Subsequently, the program is terminated.

At program point 115, controller 75 checks whether, starting from the last cycle of cylinder 10 in which the second analysis operating mode was activated, the nth cycle of cylinder 10 has been reached again in the meantime. If so, the program branches to a program point 120, otherwise the program is terminated.

At program point 120, controller 75 causes opening of both switches $S_1$, $S_2$ of circuit 30 shown in FIG. 4 and thus activates the second analysis operating mode. Subsequently, the program is terminated. The program shown in FIG. 7 may be run through repeatedly in this case, in particular for every new crankshaft angle. In this way, the first analysis operating mode and the second analysis operating mode alternate periodically, the second analysis operating mode not having to occur in every cycle of cylinder 10 as described. If value n for the frequency of the activation of the second analysis operating mode changes, the period at which the first analysis operating mode and the second analysis operating mode alternate with one another also changes.

The implementation of the two analysis operating modes using circuit 30 shown in FIG. 4 is the basis of the flow chart shown in FIG. 7.

The present invention is not restricted to the use of a combustion chamber pressure sensor for sensor element 1, but rather may be executed in a similar way for any arbitrary sensor elements, in particular for piezoelectric sensor elements and in particular for pressure sensors. The present invention is also not restricted to the temperature or the capacitance as the characteristic variable of sensor element 1, but rather is applicable in a corresponding way to any arbitrary characteristic variables of sensor element 1. The sole decisive factor is that the signal of sensor element 1, which is produced as a function of a measured variable and is output by sensor element 1, is analyzed in a first analysis operating mode to detect the measured variable and the signal of sensor element 1 is analyzed in a second analysis operating mode to detect a characteristic variable of sensor element 1 which is different from the measured variable. This may be implemented in particular, as described, by connecting the sensor element to different circuits depending on the analysis operating mode, in the first analysis operating mode the sensor element being connected to a circuit which analyzes the signal of sensor element 1 to detect the measured variable. In the second analysis operating mode, the sensor element is connected to a circuit which analyzes the signal of the sensor element to detect the characteristic variable of sensor element 1 which is different from the measured variable. In this case, only one of the two circuits is always connected to sensor element 1, depending on the analysis operating mode.

What is claimed is:

1. A method for analyzing a sensor element which outputs a signal as a function of a measured variable, comprising:
   analyzing the signal of the sensor element in a first analysis operating mode to detect the measured variable; and
   analyzing the signal of the sensor element in a second analysis operating mode to detect a characteristic variable of the sensor element which is different from the measured variable, wherein the sensor element is a combustion chamber pressure sensor for detecting a combustion chamber pressure of an internal combustion engine.

2. A method for analyzing a sensor element which outputs a signal as a function of a measured variable, comprising:
   analyzing the signal of the sensor element in a first analysis operating mode to detect the measured variable; and
   analyzing the signal of the sensor element in a second analysis operating mode to detect a characteristic variable of the sensor element which is different from the measured variable, wherein a changeover between the first analysis operating mode and the second analysis operating mode is performed as a function of at least one controlled variable,
   wherein a crankshaft angle of an internal combustion engine is the controlled variable.

3. The method as recited in claim 1, wherein the second analysis operating mode is set for a cylinder of the internal combustion engine during at least one exhaust stroke of the cylinder.

4. A method for analyzing a sensor element which outputs a signal as a function of a measured variable, comprising:
   analyzing the signal of the sensor element in a first analysis operating mode to detect the measured variable; and
   analyzing the signal of the sensor element in a second analysis operating mode to detect a characteristic variable of the sensor element which is different from the measured variable, wherein a frequency of setting the second analysis operating mode is selected as a function of a rate of change of the characteristic variable.

5. A method for analyzing a sensor element which outputs a signal as a function of a measured variable, comprising:
   analyzing the signal of the sensor element in a first analysis operating mode to detect the measured variable; and
   analyzing the signal of the sensor element in a second analysis operating mode to detect a characteristic variable of the sensor element which is different from the measured variable, wherein one of a temperature or a capacitance is analyzed as the characteristic variable of the sensor element.

6. The method as recited in claim 5, further comprising:
   incorporating the sensor element into an oscillator circuit to detect the temperature or capacitance, the oscillator circuit generating a frequency that is a function of only the capacitance of the sensor element.

7. The method as recited in claim 6, wherein the oscillator circuit is an astable multivibrator.

8. A method for analyzing a sensor element which outputs a signal as a function of a measured variable, comprising:
   analyzing the signal of the sensor element in a first analysis operating mode to detect the measured variable;
   analyzing the signal of the sensor element in a second analysis operating mode to detect a characteristic variable of the sensor element which is different from the measured variable; and
   incorporating the sensor element into an impedance transformer circuit or into a charge amplifier circuit to detect the measured variable.

* * * * *